(12) United States Patent
Gunell et al.

(10) Patent No.: US 9,217,869 B2
(45) Date of Patent: Dec. 22, 2015

(54) VIEWING WINDOW ASSEMBLY FOR SINGLE-SIDED INSTALLATION

(71) Applicant: Fluke Corporation, Everett, WA (US)

(72) Inventors: Gary J. Gunell, Woodinville, WA (US);
Richard Maday, New Hope, MN (US);
Justin M. Sheard, Rogers, MN (US);
Betsy Brest, Boulder Creek, CA (US);
Timothy J. Kesti, Monticello, MN (US)

(73) Assignee: Fluke Corporation, Everett, WA (US)

( * ) Notice: Subject to any disclaimer, the term of this patent is extended or adjusted under 35 U.S.C. 154(b) by 268 days.

(21) Appl. No.: 13/759,742

(22) Filed: Feb. 5, 2013

(65) Prior Publication Data

US 2014/0218817 A1    Aug. 7, 2014

(51) Int. Cl.
| | |
|---|---|
| *G02B 7/00* | (2006.01) |
| *G02B 27/00* | (2006.01) |
| *G02B 27/02* | (2006.01) |
| *E06B 7/30* | (2006.01) |
| *E06B 1/60* | (2006.01) |
| *E06B 3/58* | (2006.01) |
| *G02B 13/14* | (2006.01) |

(52) U.S. Cl.
CPC .............. *G02B 27/022* (2013.01); *E06B 7/30* (2013.01); *G02B 7/00* (2013.01); *E06B 1/6061* (2013.01); *E06B 3/5892* (2013.01); *G02B 13/14* (2013.01); *Y10T 29/49826* (2015.01)

(58) Field of Classification Search
None
See application file for complete search history.

(56) References Cited

U.S. PATENT DOCUMENTS

| | | | |
|---|---|---|---|
| 8,407,938 B2 * | 4/2013 | Faria | .............................. 49/149 |
| 2004/0227987 A1 * | 11/2004 | Holliday et al. | .............. 359/350 |
| 2006/0209397 A1 | 9/2006 | Holliday | |
| 2010/0020389 A1 | 1/2010 | Schmidt | |

FOREIGN PATENT DOCUMENTS

WO   WO2012037575 A1   3/2012

OTHER PUBLICATIONS

Extended European Search Report for Application No. 14154005.4, Jun. 2, 2014, 9 pages.

* cited by examiner

*Primary Examiner* — Jade R Chwasz
(74) *Attorney, Agent, or Firm* — Fredrikson & Byron, P.A.

(57) ABSTRACT

An assembly and method for installing a viewing window into a single hole in a panel of an enclosure from a single side. A viewing window assembly comprises actuators and attachment members configurable to allow the attachment members to pass through a hole in a panel from a front side. Upon actuation of the actuators, the attachment members may engage one or both of the back surface of the panel and the inner edge of the hole therein in order to secure the window assembly to the panel.

23 Claims, 10 Drawing Sheets

VIEWING WINDOW ASSEMBLY FOR SINGLE-SIDED INSTALLATION

BACKGROUND

Visual inspection is a common technique for analyzing equipment and systems for both maintenance and troubleshooting. Often times, the components to be inspected are housed within an enclosure for safety, operability, or other reasons. In such an instance, it may be preferable to enable visual inspection of such components while the enclosure is closed. In many cases, visual inspection cannot be performed through a solid enclosure, so in order to perform the inspection, a viewing window assembly may be installed into the enclosure. One illustrative example is infrared imaging of high voltage electrical equipment within an electrical cabinet. Although, imaging of high voltage electrical equipment within an electrical cabinet may be in many different wavelengths, including visible light wavelengths.

Infrared (IR) imaging has increasingly been used in the preventative maintenance of high voltage electrical circuits and components. An IR image of the components can often reveal hot spots which may indicate malfunctioning, improperly connected, or overloaded components. Timely identification of problem components can save on system downtime and expenses associated with replacing blown or destroyed components.

To effectively inspect electrical components, a thermographer should view the components with an IR camera while the components are operating or energized. However, this can be difficult because electrical components are often kept in high voltage electrical cabinets. Because an IR camera requires a line of sight to deliver a suitably accurate thermal image, components within a cabinet cannot be imaged adequately without either opening the cabinet or providing some other view into the cabinet.

Opening a high voltage electrical cabinet while the components within are energized poses a risk of arc flashing. To avoid this risk, most cabinets include door interlocks which require that the components within be powered off before the cabinet can be opened. But when the power is turned off the components within the cabinet begin to cool and heat within the cabinet is rapidly dissipated or redistributed. This rapid heat dissipation precludes adequate identification of hot spots in a particular thermal image.

As an alternative to imaging cool components by opening the cabinet door, the thermography industry has placed fixed IR transmitting windows in a panel or door of high voltage electrical cabinets. These windows can provide a line of sight within the cabinet so that it may be inspected without being opened while the components within are energized.

However, these windows may be difficult and/or time intensive to install into a cabinet that does not have one built into it, as they often require shutting down, opening, and/or disassembling the cabinet.

Previous IR windows aimed toward this purpose have required access to both sides of a panel that makes up a portion of the cabinet for installation. As such, the cabinet must at least be opened, if not disassembled, to permit such two-sided access to the desired panel in a way that permits the requisite amount of maneuverability for installation. Additionally, repair or replacement of such a window may require further opening and/or disassembly of the cabinet to allow the appropriate access. Furthermore, many previous windows have required multiple holes in the panel of the cabinet for installation—a first hole for holding the main, viewing portion of the window, and auxiliary holes for securing the window or window assembly to the cabinet.

Similar situations may apply to other types of inspection aside from thermal imaging as well, additionally or alternatively requiring visual inspection of equipment in the visible and/or ultraviolet wavelength regions.

SUMMARY

Embodiments of the present invention relate to a viewing window assembly for installation into a single hole from a single side of a panel of an enclosure, and a method of installing the same. Various embodiments and methods fall within the scope of the invention.

Certain embodiments of the viewing window assembly comprise a front side, a back side, a frame, and an optic defining a central axis. One or more actuators are actuatable from the front side of the assembly, and are each coupled to an attachment member on the back side of the assembly, which faces the interior of an enclosure through a hole in a panel when mounted therein. When actuated, an actuator may cause its respective attachment member to move in a direction away from the central axis and towards the panel of the enclosure. The attachment member may engage an inner surface of the panel of the enclosure and secure the viewing window assembly thereto utilizing a single hole and accessing it from a single side. Actuators may comprise bolts passing through the frame at an angle in order to move attachment members such as nuts both towards the panel and away from the central axis.

Embodiments of the invention further relate to a method for installing a viewing window assembly into a panel of an enclosure. Such a method may comprise providing a hole in the panel and the viewing window assembly including a frame and an optic. The method may further comprise inserting the viewing window assembly through the hole from outside of the enclosure and actuating components of the viewing window assembly from outside of the enclosure. Actuating the components may secure the viewing window assembly to the panel while only penetrating said panel through a single hole.

Additional aspects of the invention may comprise a gasket to create a seal surrounding the hole to discourage the flow of particulates such as dust into the enclosure from the exterior, or a cover for selectively covering the optic. The viewing window assembly may also be electrically grounded to the enclosure by engaging a conducting surface and/or by penetrating an insulating surface of the panel with a conducting element such as a plurality of teeth.

Viewing window assemblies and methods for the installation thereof fall within the scope of the present invention. The details of one or more examples and embodiments of the invention are set forth in the accompanying drawings and the description below. Other features, objects, and advantages will be apparent from the description and drawings, as well as from the claims of the invention.

BRIEF DESCRIPTION OF THE DRAWINGS

FIG. 5b shows a zoomed-in view an attachment member of the embodiment of FIG. 5a.

DETAILED DESCRIPTION

Figure 1:
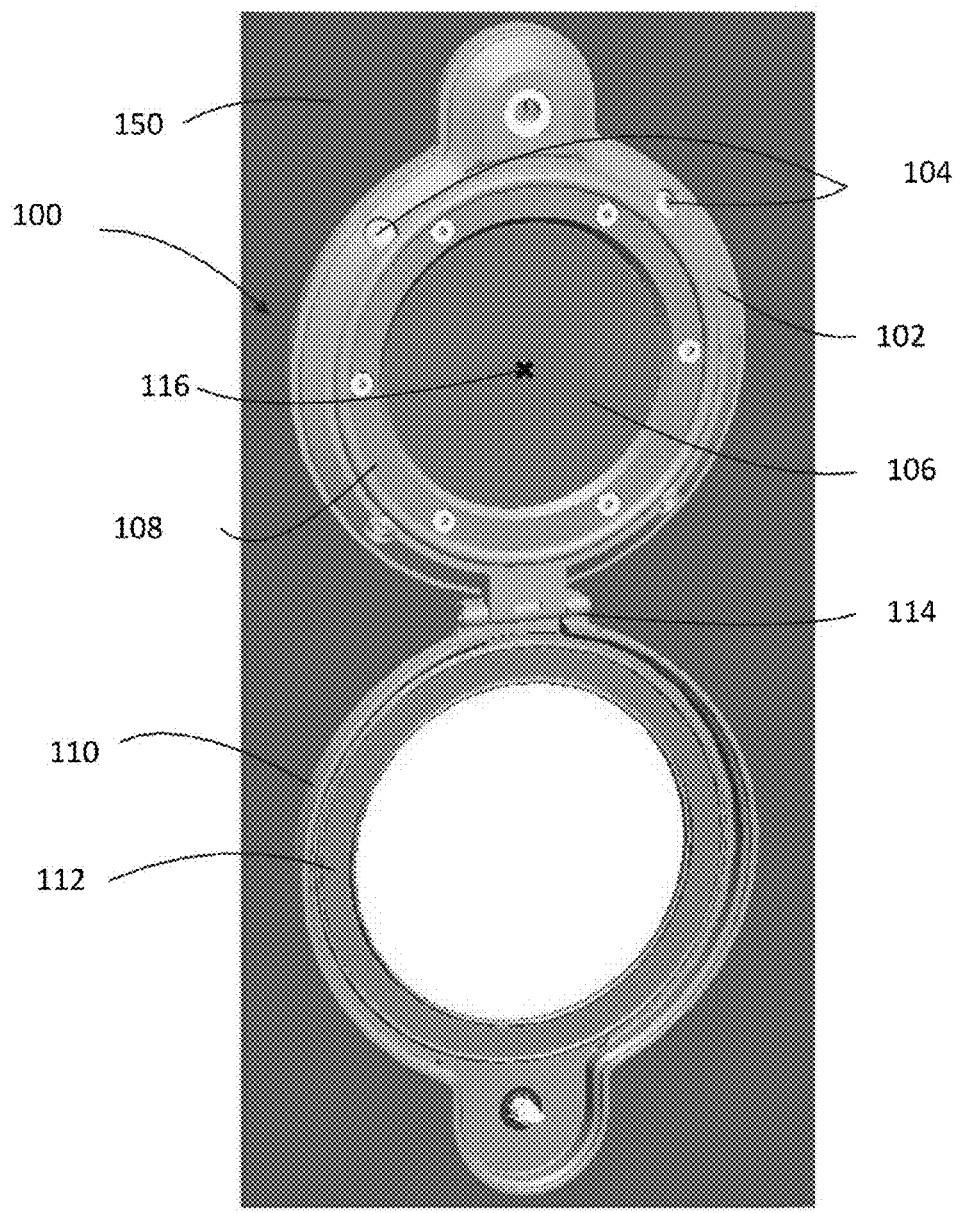
FIG. 1 shows the front of a viewing window assembly installed in a hole in a panel of an enclosure.

Visual inspection is a technique with many applications. In some cases, it is advantageous to be able to observe a scene of an object or objects inside of an enclosure. Such as the case with an electrical cabinet, for example, it may be preferable or necessary to view the scene inside of the enclosure with the enclosure closed. Thus, optically transmitting windows have been installed in panels of enclosures in order to allow appropriate imagers to observe the desired electromagnetic signals coming from within the enclosure. However, many previous such windows and window assemblies have been inconvenient to install. Often, installation requires access to both sides of a panel of the enclosure in order to install the window therein. Additionally, multiple holes in the panel are often necessary in order to secure the panel to the enclosure and/or electrically ground the window to the panel. Embodiments of the present invention involve a viewing window assembly not requiring access to both sides of a panel for installation or repair. Viewing, herein, is taken to mean observing at least a portion of an electromagnetic spectrum, and may be done with the eye, a camera, or any other optical sensing element. The assembly described herein may comprise infrared window assemblies, wherein the window is designed to transmit at least, or alternatively, at most, infrared radiation. Additional embodiments of the invention may be designed to transmit additional or alternative portions of the spectrum, such as visible and/or ultraviolet wavelengths. Moreover, certain embodiments the window assembly of the present invention require only a single hole for installation and securement of the window assembly to an enclosure such as an electrical cabinet. In the following description of embodiments of the invention and the figures, several embodiments of the viewing window assembly will be described. It should be appreciated that in each embodiment, unless otherwise specified, the window may be transmissive to various portions of the electromagnetic spectrum, including visible, infrared, and ultraviolet radiation. Where applicable, like reference numbers will be used for like components. Further, like components may appear distinct among differing embodiments of the invention while remaining functionally similar. In such a case, like reference numerals may be used to describe functionally similar components.

FIG. 1 illustrates one embodiment of the present invention. FIG. 1 shows a front side of a viewing window assembly 100, facing away from and mounted into a single hole in a panel 150 of an enclosure, created by a standard Greenlee® punch or other known hole creating methods, for example. While the window assembly is installed through the hole from a single side, it is noted that it may be necessary to access both sides of the panel in order to appropriately create the single hole in the panel. If the hole already exists, certain embodiments of the invention provide the ability to install the window assembly while accessing only the front side of the panel. Among some embodiments, the hole may range in size between two and five inches in diameter, and further may be a standard punch size. The viewing window assembly 100 comprises a frame 102 and an optic 106, which may be selectively transmissive to certain portions of the spectrum. The illustrated embodiment further comprises actuators 104 for securing the viewing window assembly 100 to the panel 150, and, in some embodiments, compressing a gasket between the frame 102 and the panel 150 to create a seal between the interior and exterior of the enclosure. This may prevent the release of potentially harmful substances from the enclosure into the surrounding environment external thereto, or the undesired entry of particulates such as dust into the enclosure. In some embodiments, the seal created is airtight, however it need not be.

In some embodiments of the invention, the viewing window assembly 100 may additionally comprise a retaining ring 108 for securing the optic 106 to the frame. The retaining ring 108 may be removed from the front side in order to remove the optic 106 from outside of the enclosure, for example from the front of the enclosure. With such a retaining ring, the optic may be removed from the viewing window assembly and/or replaced by another optic without interior access to the enclosure or removing the assembly therefrom. The optic may define a central axis of the assembly, which travels through the center of the optic in a direction normal thereto. The optic may be a circle, as shown in FIG. 1, but may be formed in other shapes as well, with the central axis being definable through a point within the boundary of the shape. The optic 106 may comprise a material that permits the transmission of radiation at desired wavelengths. For example, in the case of an infrared window assembly, the optic may comprise a crystal glass material for allowing the transmittance of IR energy, such as calcium fluoride, barium fluoride, or any other IR-transmissive optic material. If the window is meant for transmitting visible or ultraviolet light, additional materials may be used.

The viewing window assembly 100 may further comprise a cover 110, as shown in FIG. 1. The cover is intended to cover the front side of the optic 106 from the environment external to the enclosure to prevent, for example, damage to the optic from outside of the enclosure or the release of anything from inside the enclosure to the external environment should the optic break. In some embodiments the window assembly further comprises a cover gasket 112 seated between the cover 110 and the frame 102 when the cover 110 is in the closed position. This cover gasket 112 may create a seal between the interior and exterior of the enclosure if the optic should break or fail in some other way. FIG. 1 shows the cover gasket 112 secured to the cover 110 while it is in the open position. Additionally, in certain embodiments of the invention, the cover 110 is removable from the optic, and may be completely removable from the viewing window assembly 100. Alternatively, the cover 110 may be attached to the viewing window assembly 100, via a hinge 114, for example.

Figure 2:
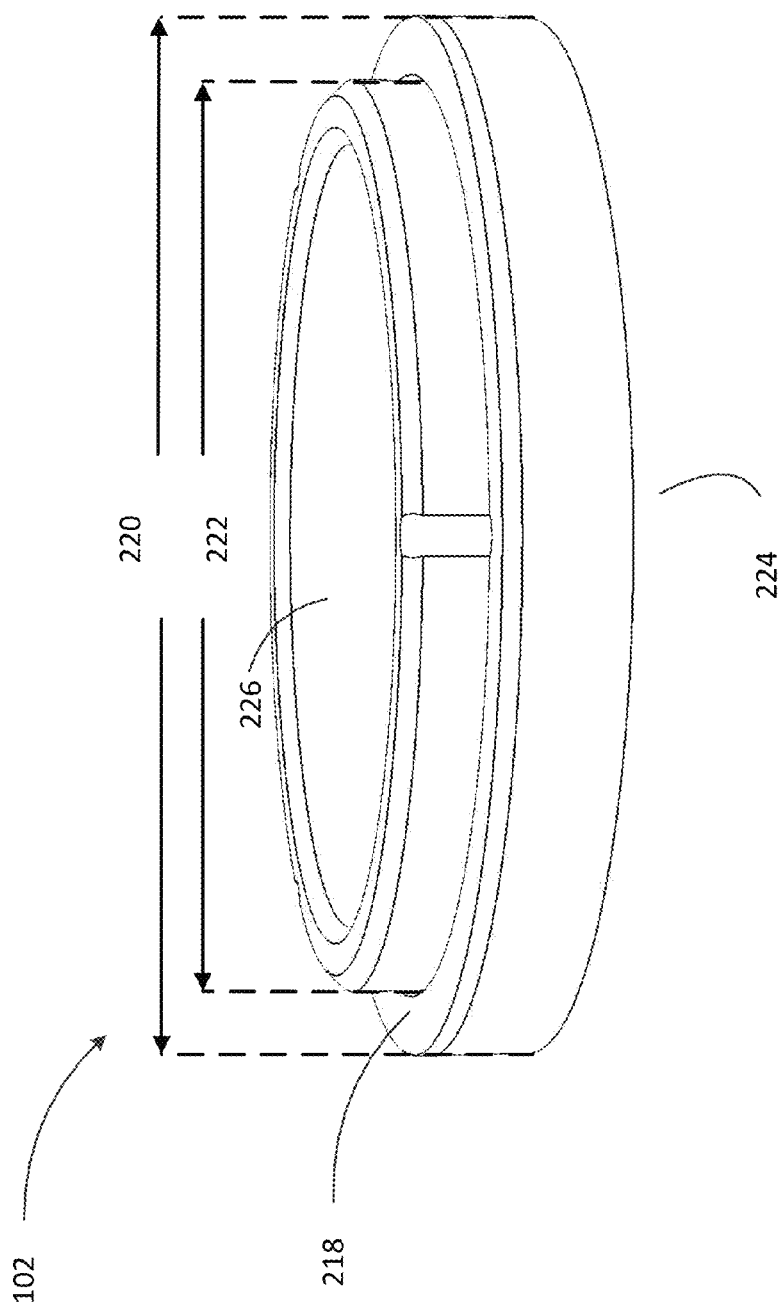
FIG. 2 shows a frame of an embodiment of the viewing window assembly.

FIG. 2 shows a frame of an embodiment of a viewing window assembly for installing into a single hole in and from a single side of an enclosure. Frame 102 comprises two sides, a front side with a first diameter 220, and a back side with a second diameter 222, the second diameter 222 smaller than the first 220. In this embodiment, the diameter of the smaller, back side is smaller than but comparable to the size of the hole in a panel so that the portion of the frame of this diameter may be placed in or through the hole in the panel. The diameter of the front side, on the other hand, is larger than that of the hole, creating something of a shoulder 218, not allowing the entire frame 102 to pass through the hole.

Figure 5A:
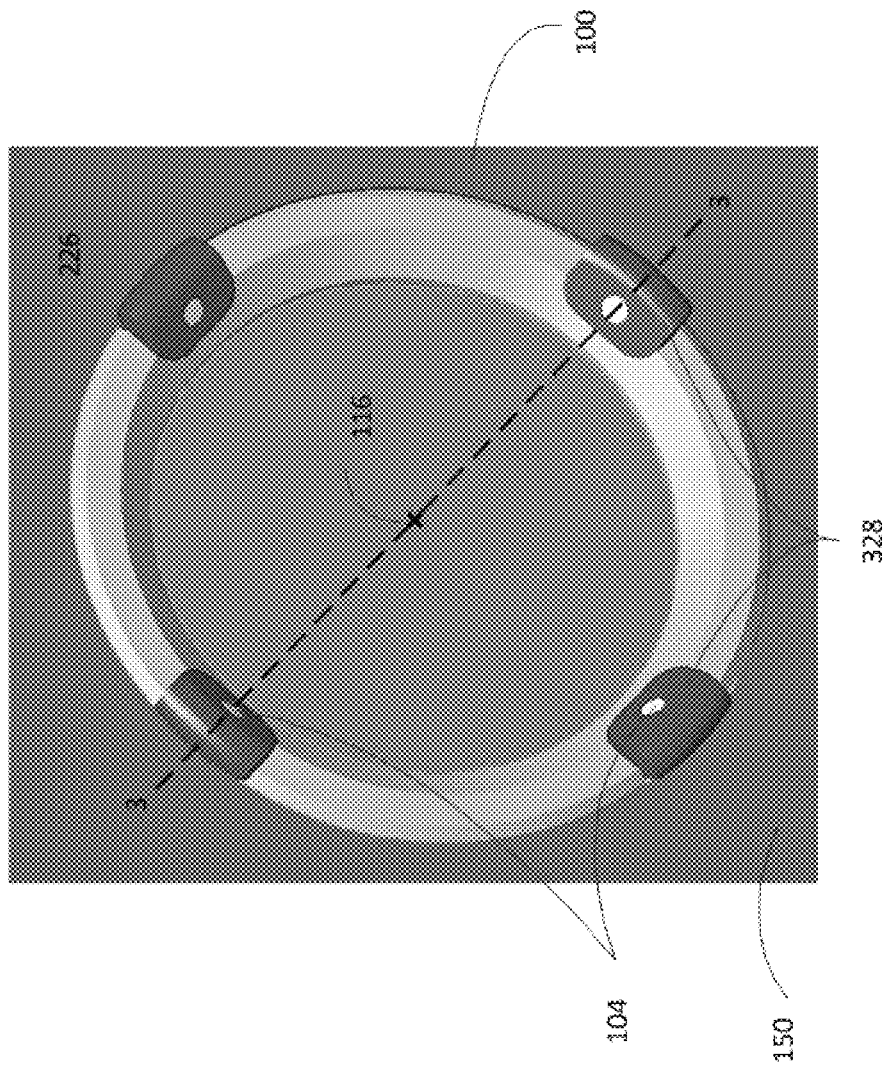
FIG. 5a shows the back of a window assembly installed in a hole in a panel of an enclosure.

FIG. 5a shows a back view of an embodiment of the invention, shown as installed into a hole in a panel and looking at it from the inside of the enclosure. In some embodiments of the invention, this figure shows the rear view of FIG. 1, with attachment members 328 engaging the panel 150 from inside of the enclosure.

Figure 3A:
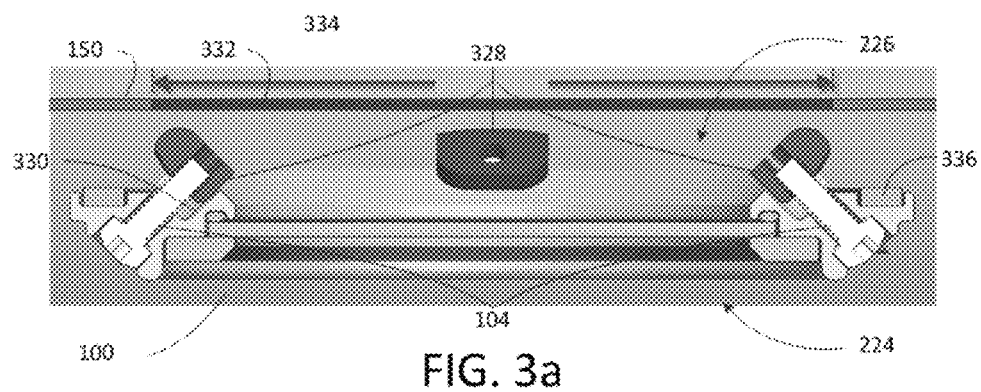
FIGS. 3*a*-3*c* show a cross-sectional view of the travel of a window assembly through a hole in a panel, taken along line 3-3 of FIG. 5*a*.
Figure 3B:
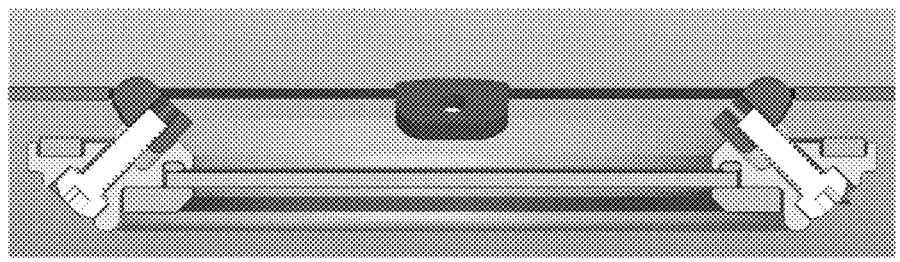
Figure 3C:
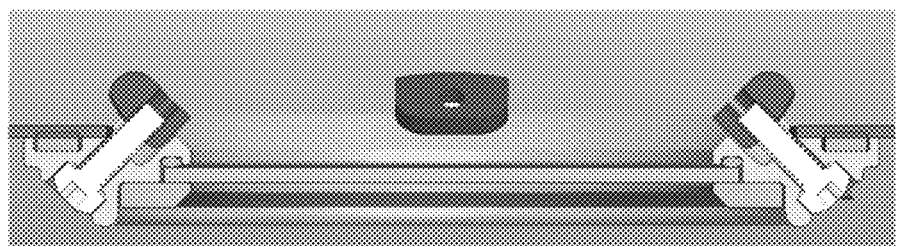

FIGS. 3a-3c show a cross-sectional view of the installation of an embodiment of the invention into a single hole from a single side of a panel of an enclosure, taken, for example, at 3-3 in FIG. 5a. FIG. 3a shows a cross-sectional view of the assembly 100 prior to installation into the hole 332 in the panel 150. The assembly has a front side 224 facing away from the enclosure 334 and a back side 226, opposite the front and facing toward the enclosure. This designation of the front side referring to the side facing externally from an enclosure and back side referring to the side facing internally to the enclosure will be used throughout the disclosure unless otherwise noted. The assembly further comprises actuators 104, extending longitudinally through a frame 102 and coupled to attachment members 328. The attachment members may be freely rotatable, rotatably fixed, or rotatable only through a limited extent, and are translatable by actuating the actuators, while the actuators may be actuatable from the front side of the assembly. In certain embodiments of the invention, the translation of attachment members may be limited to a certain distance.

In the embodiments of FIGS. 3a-3c, attachment members 328 reside in channels 330 formed in the back side of the frame 102. These channels may be configured relative to the attachment members 328 so as to disallow rotation of thereof. Since the attachment members 328 are translatable, in some embodiments of the invention, the channel 330 in the frame 102 may prevent rotation of the attachment member 328 in any translated position. In some embodiments, actuators 104 may comprise bolts and attachment members may comprise nuts, wherein actuating the bolts comprises turning said bolts, resulting in translation of the nuts. It will be appreciated that in a typical nut-bolt configuration, if the nut is free to rotate it may be difficult to achieve translation of the nut along the bolt, as the two may spin in unison. However, if the nut is not able to rotate freely or only a limited amount of rotation is permitted, translation by the nut along the axis of the bolt is effected by rotation of the bolt. This may be accomplished, for example, by the aforementioned channel, which may abut the nut in certain configurations of certain embodiments, preventing its rotation. It should be noted that nut, herein, refers to any member threaded to engage a bolt or other threaded member.

In this embodiment, the actuators extend through the frame at a non-90 degree angle, wherein the end of the actuators on the front side 224 of the assembly 100 are located radially inward from the end of the actuators on the back side 226 of the assembly, nearer the central axis. Thus, when actuated, the actuators may cause the attachment members to translate in a direction with a component that is either radially inward or radially outward relative to the central axis. In some embodiments, this angle may range between 30 and 60 degrees. In FIG. 3a, the viewing window assembly 100 is shown as being located completely externally to and in front of the enclosure 334, with the attachment members 328 located such that they are within the area defined by the hole 332 in the panel 150 and are located some distance away from the frame 102 in the direction of the actuators 104.

FIG. 3b shows the viewing window assembly of FIG. 3a as it is being inserted into the hole 332 in the panel 150 from the front side of the panel. Attachment members 328 are positioned such that they may move through the hole 332 towards the inside of the enclosure 334. FIG. 3c shows the viewing window assembly inserted further into the hole 332 in the panel 150. Here, the shoulder of the frame 102 of the assembly 100 abuts the panel 150 in a way such that the assembly 100 cannot travel further into the enclosure 334. Additionally, the embodiment shown in FIGS. 3a-3c comprises a gasket positioned between the frame 102 and the panel 150, creating a seal therebetween if compressed. Once the viewing window assembly 100 is in the position illustrated in FIG. 3c, the actuators 104 may be actuated such that the attachment members 328 are drawn both radially outward, away from the central axis, and towards the panel 150. Attachment members eventually contact a part of the panel 150, compressing the gasket and securing the viewing window assembly to the enclosure 334.

Figure 4A:
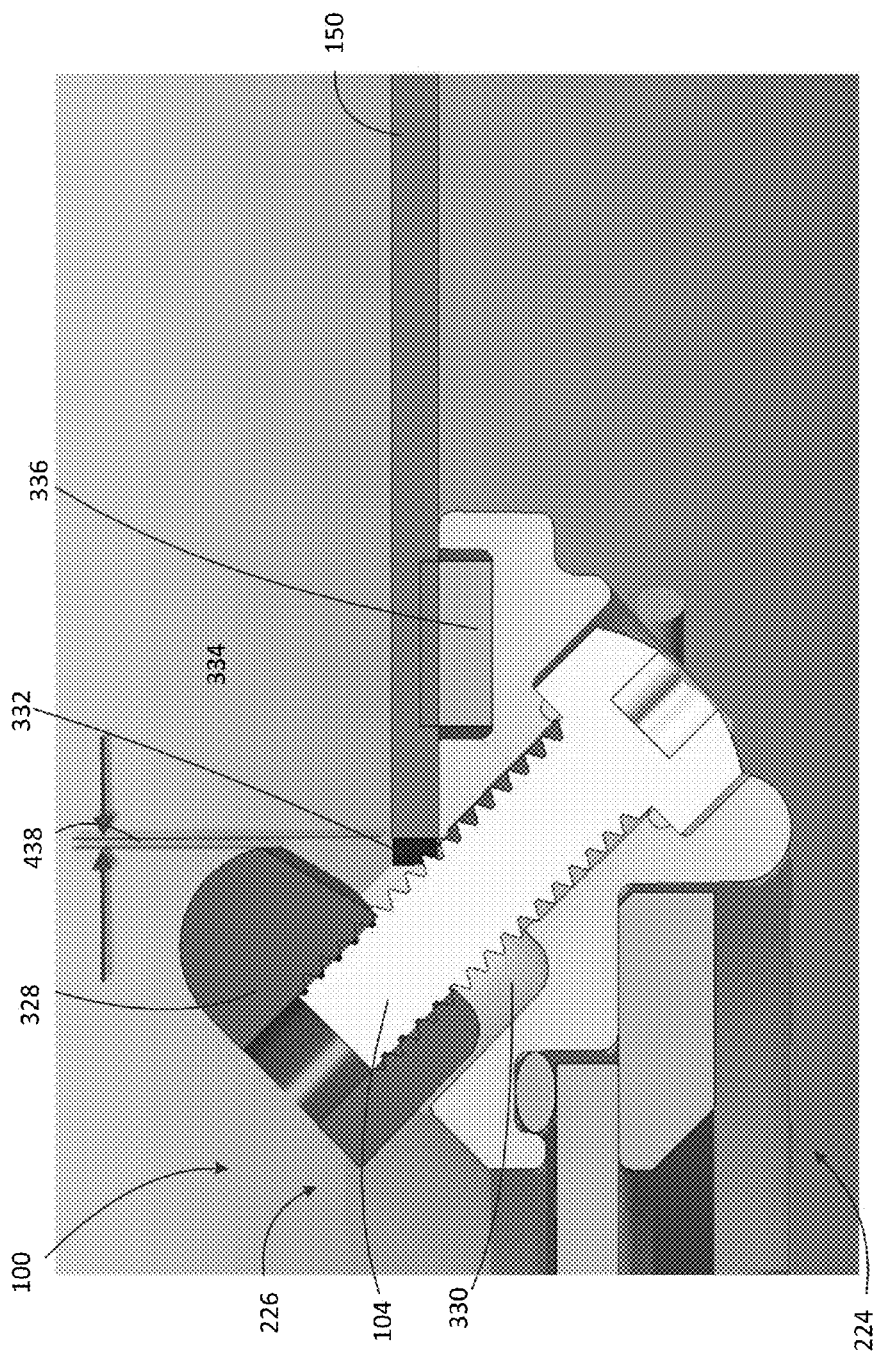
FIG. 4*a* shows an embodiment of the invention in an installation configuration.

FIG. 4a shows a magnified view of a portion of an embodiment of the invention similar to that of FIGS. 3a-3c, zoomed in around one of the attachment members and actuators and with portions of the assembly 100 inserted into a hole 332 in a panel 150 of an enclosure 334. In FIG. 4, the radial extent of attachment member 328 does not extend outward beyond the edge of the hole 332 in the panel 150, as shown by location lines 438. This allows for the attachment member 328 to be inserted into the hole 332 of the panel 150. With the attachment member 328 through the hole 332, the frame 102 of the assembly 100 may be pressed to the front side of the panel 150 outside of the hole 332. In this embodiment, gasket 336 is present to create a seal between the interior and exterior of the enclosure 334 that circumvents the hole 332. The actuator 104 shown is positioned at a non-90 degree angle relative to the plane of the panel 150, allowing for the coupled attachment member 328 to translate not only towards or away from the panel 150 but also laterally (radially) relative to the hole 332. Among various embodiments, this angle may range from 30 to 60 degrees. Note that in the configuration shown in FIG. 4a, since the attachment member 328 is located in a position along the actuator 104 so that it may pass through the hole 332 in the panel 150. Thus, the attachment member 328 need not translate further radially inward for installation or attachment purposes. In certain embodiments of the invention, radially inward translation inward may be limited to or near such a position to prevent the attachment member 328 from becoming decoupled from the actuator 104. Additionally, note that, although the attachment member 328 of the embodiment in FIG. 4a extends such a distance along the actuator, it still lies in the channel 330 of the frame 102 which may prevent rotation of the attachment member 328.

Figure 4B:
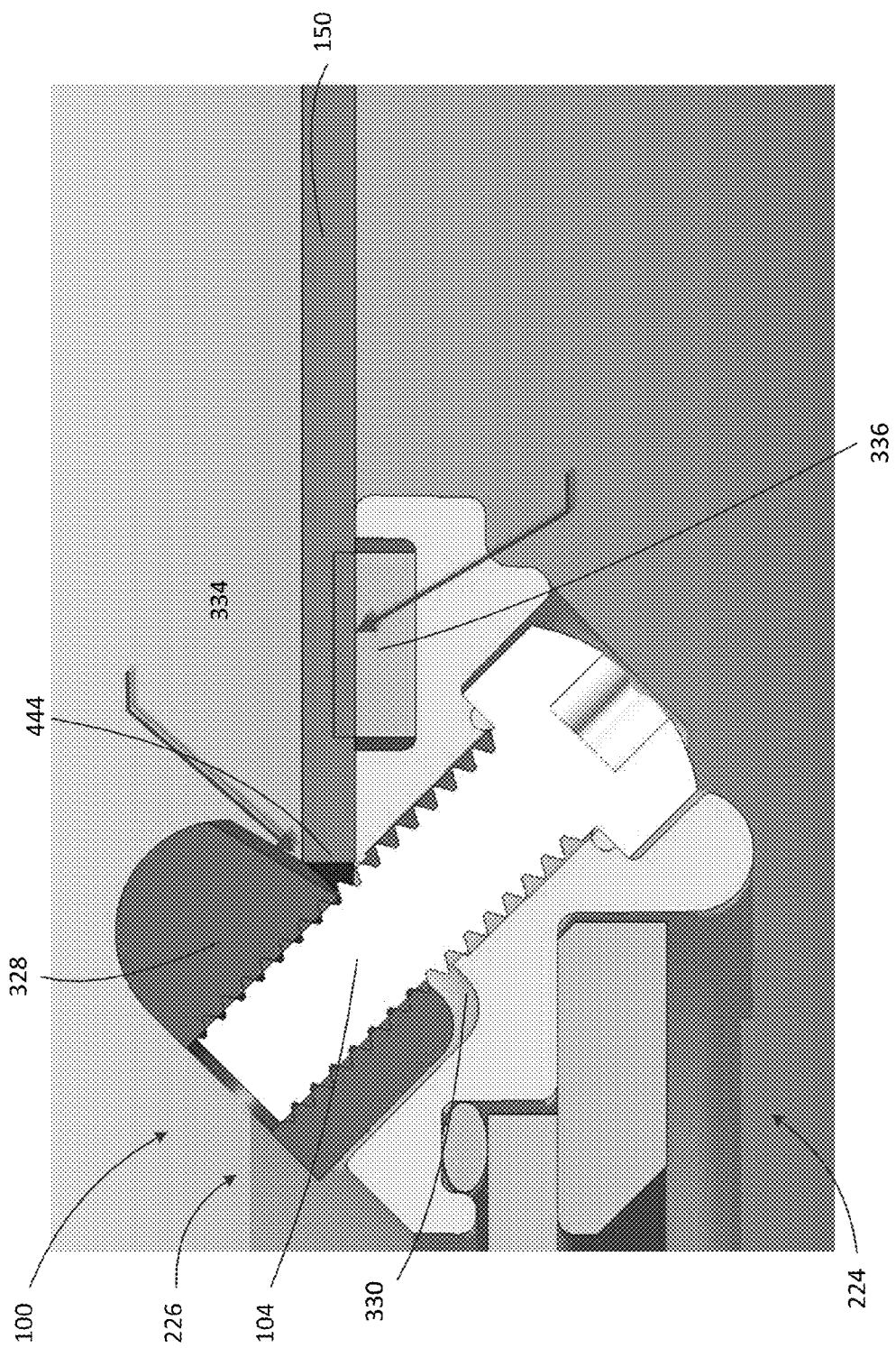
FIG. 4b shows the embodiment of FIG. 4a in a secured configuration.

FIG. 4b shows a magnified view of the embodiment of FIG. 4a with the attachment member 328 translated by way of actuating the actuator 104. Here, the attachment member 328 has translated within the channel 330 and in the longitudinal direction along the axis of the actuator 104, contacting an inside surface of the panel 150. The inside surface of the panel 150 may comprise any part of the panel that is not exposed to the enclosure's external surroundings, including the inner edge 444 of the hole 332 in the panel 150. In this embodiment, the attachment member 328 contacts the inner edge 444 of the hole 332 in the panel 150. In some embodiments, the attachment member 328 may comprise at least one tooth on the surface that contacts the panel 150, and in some embodiments may comprise a plurality of teeth. As defined herein, teeth may comprise any pointed element, and may at least partially penetrate the panel 150 or a coating thereon to facilitate a secure connection and/or to provide electrical conductivity between the viewing window assembly and the enclosure. This electrical conductivity may be advantageous if the enclosure is an electrical cabinet, as the window assembly may build up a charge if not grounded to the enclosure.

FIG. 5a shows an embodiment of a viewing window assembly installed into a panel of an enclosure such as an electrical cabinet, viewed from inside of the enclosure. FIG. 5a shows the back side of the viewing window assembly 100 as it is facing the interior of the enclosure. The viewing window assembly 100 comprises an optic 106 defining a central axis, a frame, and attachment members 328. In this embodiment, attachment members are coupled to actuators 104 which, when actuated from the front side of the assembly outside the enclosure, translate the attachment members 328 in a direction with a component towards or away from the central axis. FIG. 5a shows the attachment members abutting the panel 150 of the enclosure, securing the viewing window assembly 100 in place. Since they are translatable with a radially outward component, the attachment members 328 are able to engage the interior of the panel 150, on the inside surface of or near the hole 332 in the panel 150. The pressure applied from the attachment members 328 onto the panel 150 squeezes the panel and the frame 102 together, securing the frame, and thus the assembly 100 to the panel 150. The squeezing together of the panel and frame may further compress a gasket, creating a seal between the interior and exterior of the panel. According to some embodiments of the invention, the seal may be an airtight seal.

Figure 5B:
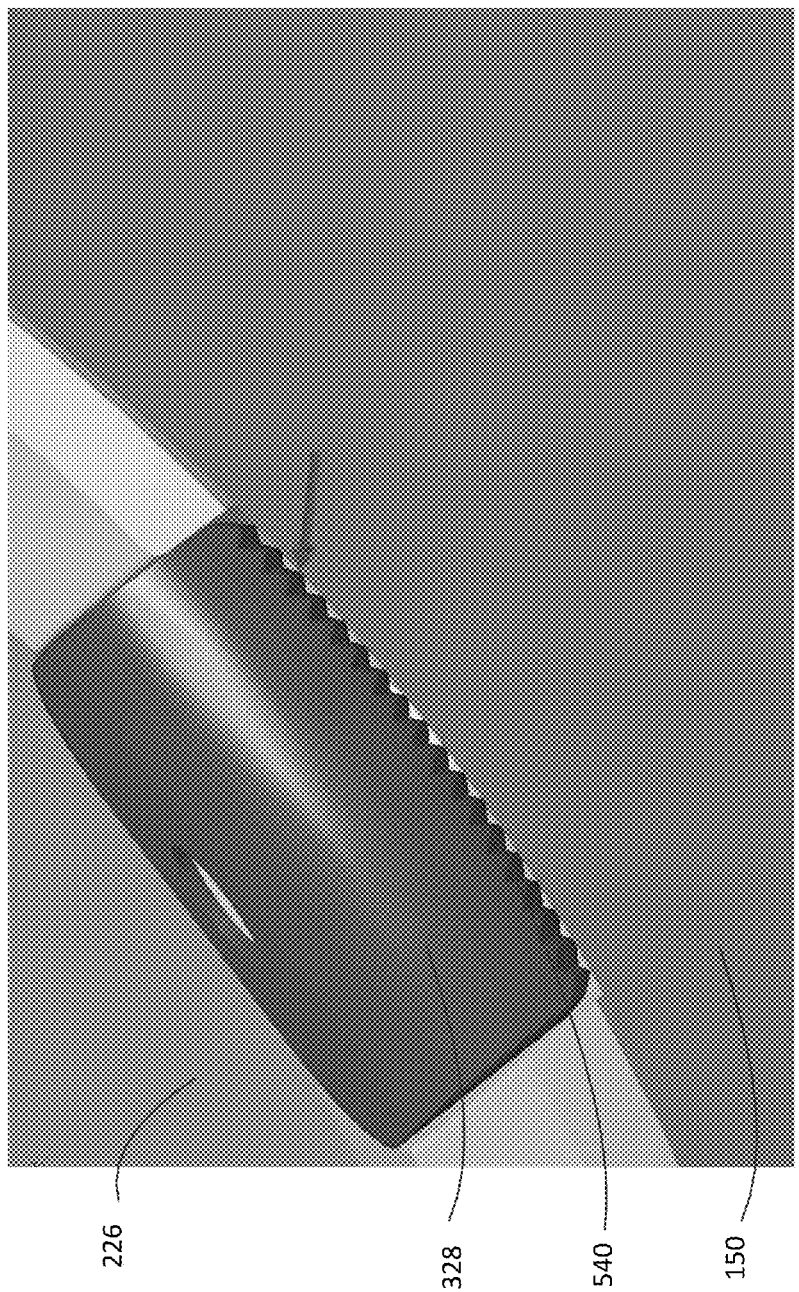

FIG. 5b shows a perspective view of an attachment member of FIG. 5a, zoomed in on the back side of the viewing window assembly, viewed from inside of the enclosure. The attachment member 328 of FIG. 5b further comprises teeth 540, which engage an inside surface of the panel 150 near the hole 332. The teeth may engage the planar inside surface of the panel 150 or the inner edge of the hole in the panel 150. In either case, the teeth 540 act to penetrate the surface of the panel 150 in order to securely attach the assembly 100 to the panel 150 and also to facilitate an electrical connection therebetween. In doing so, the viewing window assembly 100 becomes grounded to the panel 150, reducing the possibility of a build-up of electric charge on the assembly. This is especially useful when the enclosure is an electrical cabinet and also useful when the cabinet is painted metal or metal coated with some type of electrical insulator since the teeth may penetrate the outer coating to contact the conductive metal of the enclosure. It will be appreciated that any embodiment described herein that engages a panel may comprise at least one tooth for such purposes. While the exemplary embodiments illustrated thus far comprise similarly shaped attachment members, other embodiments of the invention may comprise entirely different attachment members.

Figure 6A:
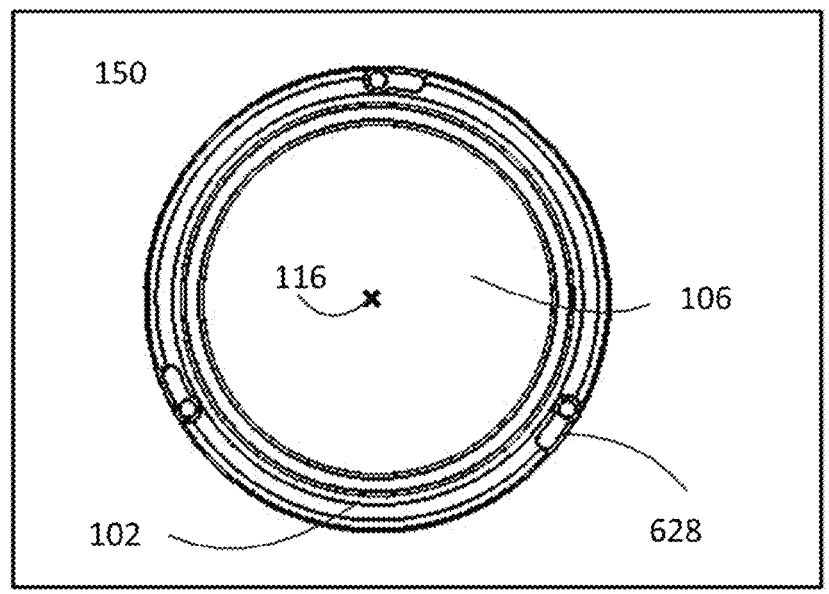
FIG. 6a shows an embodiment of the invention with alternative attachment member in an installation configuration.
Figure 6B:
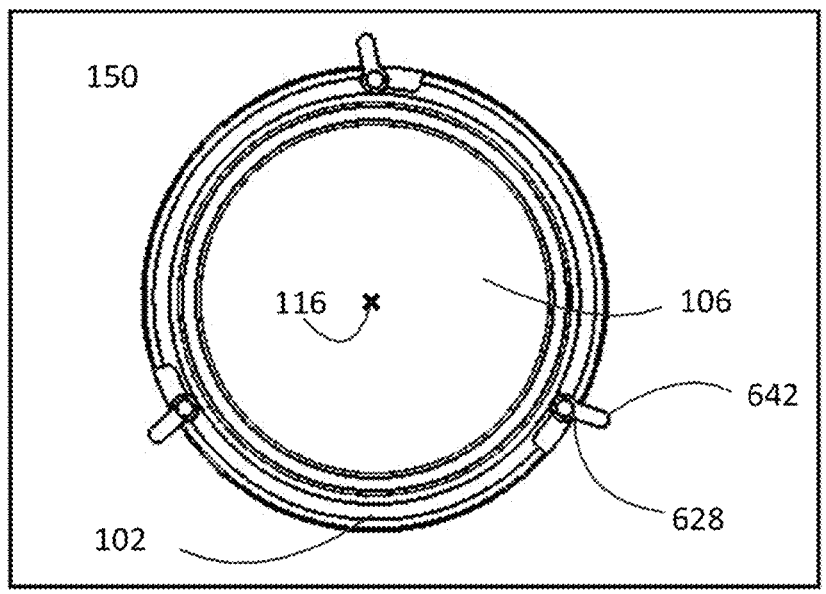
FIG. 6b shows the embodiment of FIG. 6a in a secured configuration.

FIG. 6a and Bb show another embodiment of the invention. The embodiment in FIGS. 6a and 6b is very similar to that shown in previous embodiments, such that only the main differences between the embodiments are indicated. FIG. 6a shows the back side of a viewing window assembly from inside of an enclosure, configured to allow installation and removal of the viewing window assembly to and from a hole in a panel of the enclosure. The viewing window assembly 100 is shown inserted into but not secured to a panel 150, further comprising a frame 102, an optic 106, attachment members 628, and an actuator 104 associated with each attachment member 628. In FIG. 6a, attachment members 628 are positioned substantially within the boundary of the portion of the frame 102 inserted into the hole 332 in the panel 150 such that at least portions of the attachment members 628 also pass through the hole 332. Note that while portions of the frame 102 pass through the hole 332, other portions may act as a stop from preventing the entire frame 102 from passing through the hole 332, as described above with regard to FIG. 2. This stopping portion contacts the panel outside the enclosure as the frame 102 is being inserted, preventing it from traveling through the hole beyond a certain distance. The viewing window assembly may further comprise a gasket positioned between the stopping portion and the panel so that, when compressed, the gasket may create a seal around the hole 332 between the interior and exterior of the enclosure. In some embodiments, this seal may be airtight to prevent the inward or outward flow of air between the enclosure and surrounding environment. In other embodiments, the seal me be such that it is substantially dustproof, which is to say it inhibits the flow of dust into the enclosure through the hole in which the viewing window assembly resides.

In this embodiment, the attachment members are rotatable only through a certain range of angular positions due to the shape of the attachment members and to portions of the frame that prevent the attachment members from rotating freely. The attachment members rotate between a position that extends beyond the extent of the panel hole and a position that retracts the attachment members within the extent of the panel hole. The attachment members are coupled to the actuators such that, if able, an attachment member will rotate upon actuation of the associated actuator. However, if the attachment member is unable to rotate, it will translate in a direction along the longitudinal central axis of the associated actuator. Thus, the viewing window assembly may be installed into or removed from outside of a single hole in a panel of an enclosure.

In the configuration of FIGS. 6a and 6b, the actuator is positioned assymetrically on the attachment member 628, such that the attachment member 628 includes a wing portion 642 that rotates inward (FIG. 6a) to a retracted position and rotates outward (FIG. 6b) to an extended position. Thus, since the attachment member 628 rotates asymmetrically about the actuator 104, and is also translatable, parts of the wing portion may generally move in a direction radially outwards or inwards and also towards or away from the panel 150.

FIG. 6b shows the back side of a viewing window assembly from inside the enclosure, configured to secure the viewing window assembly to the enclosure. In FIG. 6b, the attachment members 628 of FIG. 6a have rotated partially outward, such that the wing portion now overlaps a portion of the panel 150. Moreover, in this configuration, attachment members 628 may have translated axially along the actuator to engage the inside surface of the panel 150. In an exemplary embodiment, actuators 104 may comprise bolts and attachment members 628 may comprise nuts, for example wing nuts, and in which the nuts are allowed to partially rotate. In this case, as the bolts are rotated, the associated nuts may rotate as well, however only through a certain range, in this case the point where the distal end of the nut (the wing) overhangs the panel. Once the nut has reached its rotatable limit, the bolt begins to rotate within the nut, causing the nut to translate along the longitudinal direction of the bolt. The nut may translate such that it engages the panel, wherein subsequent rotation of the bolt presses the window assembly and the panel together, potentially compressing a gasket located therebetween to create a seal. The nut may further comprise at least one tooth for engaging the panel and puncturing a surface coating that may be applied thereon.

When the actuators are rotated in the opposite direction, the movement of the nut is reversed (e.g., longitudinal translation along with bolt accompanied by rotation of the nut such that the wing rotates inward, as in FIG. 6a). In the position shown in FIG. 6a, the viewing window assembly may be removed from the hole in the panel enclosure. It is noteworthy that the bolts may be rotated from the front side (not shown) of the viewing window assembly, implying that the assembly may be installed into a single hole in a panel of an enclosure entirely from the outside of the enclosure. Other actuators and attachment members to perform similar functions are also contemplated. It will be appreciated that the viewing window assembly of FIGS. 6a and 6b may comprise an infrared window assembly, wherein the optic comprises an infrared transmissive material.

Figure 7A:
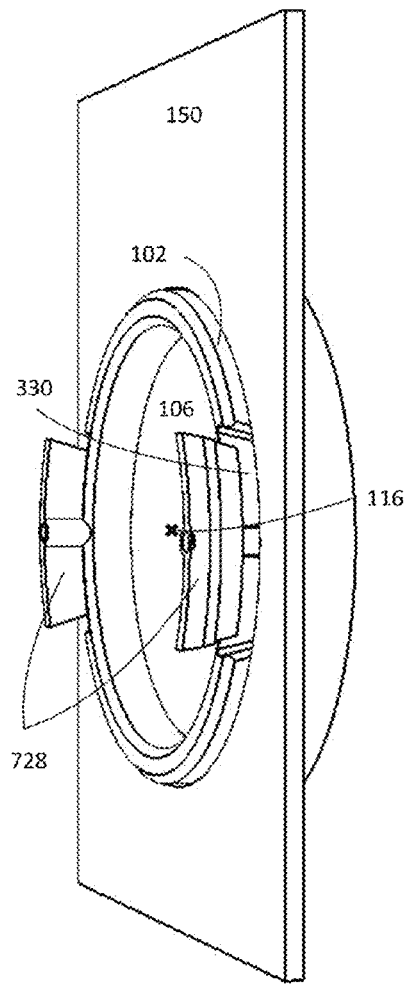
FIG. 7a shows an embodiment of the invention with alternative attachment member in an installation configuration.
Figure 7B:
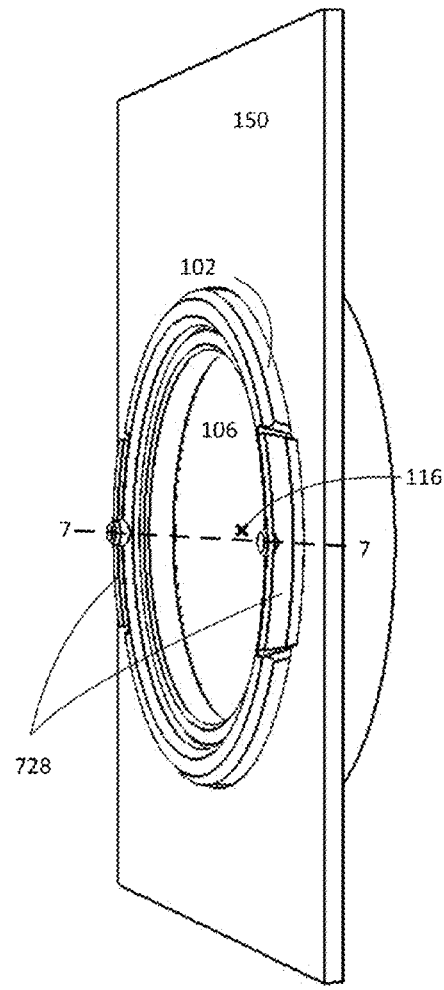
FIG. 7b shows the embodiment of FIG. 7a in a secured configuration.
Figure 7C:
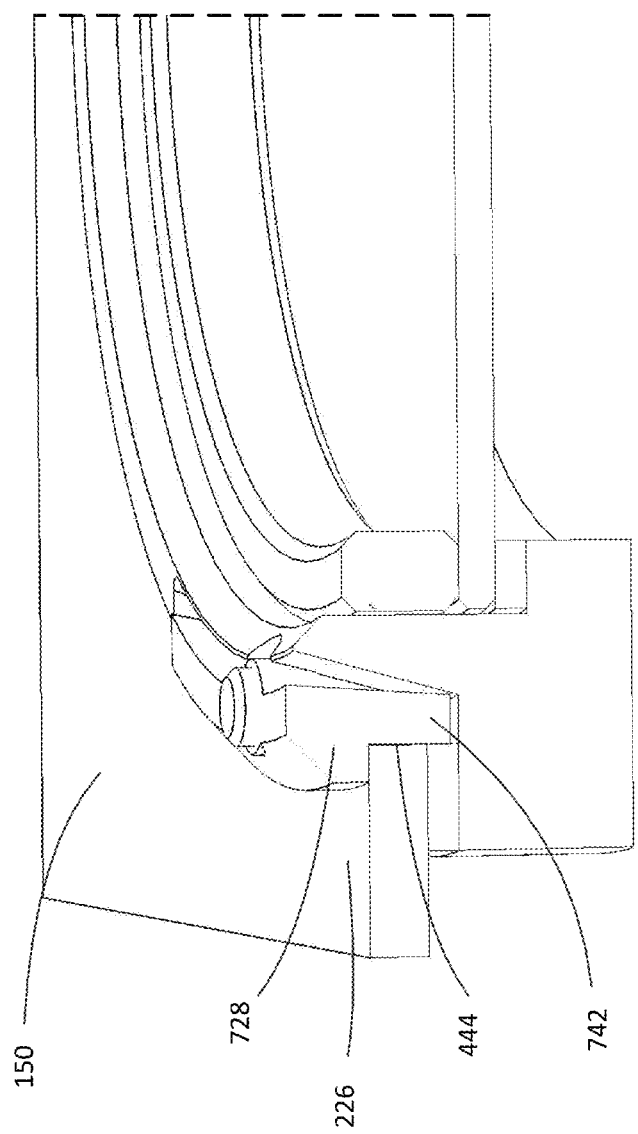
FIG. 7c shows a portion of a cross section of the embodiment shown in FIG. 7b, taken at line 7-7.

Yet another embodiment of the invention is shown in FIGS. 7a-7c. FIG. 7a shows a perspective view of the back side of a viewing window assembly, such as an infrared window assembly, in a panel of an enclosure, configured to allow installation and removal of the viewing window assembly to and from a hole in the panel. This embodiment functions similarly to that of FIGS. 4a and 4b, and like components will be represented by like numerals. The embodiment shown comprises a frame 102, attachment members 728 residing in channels 330 to limit rotation, and an actuator 104 associated with each of the attachment members. FIG. 7a shows a similar configuration as FIG. 4a, wherein the frame 102 of the viewing window assembly is adjacent a panel 150 comprising a hole 332, with portions of the frame 102 protruding through the hole 332. As is the case in FIG. 4a, attachment members 728 fit and extend through the hole and are coupled to actuators 104 accessible from the front side of the window assembly 100. Actuating the actuators 104 causes the attachment members 728 to translate in a direction with a component at least radially outward, away from the central axis 116, and towards the panel 150, eventually resulting in the attachment members 728 engaging the panel 150 as shown in FIG. 7b.

FIG. 7b shows a similar configuration as does FIG. 4b, wherein the attachment members 728 have been moved such that they now engage an inside surface of the panel 150. In a manner similar to that described regarding FIG. 4b, actuators 104 may be actuated from the front side of the assembly 100 in order to retract the attachment members 728 away from the central axis 116 and back toward the panel 150 until they are engaged therewith. In some embodiments, attachment members 728 may comprise elongated nuts, each with a wedge portion and including a threaded hole therethrough as shown in FIG. 7b, and actuators 104 may comprise bolts, threadably engaged with elongated wedges via the hole therethrough. The nuts may be arranged in such a way that they are prevented from rotating freely by portions of the window frame 102, such as the channels described above relative to FIGS. 3a and 4a). Thus, as the bolts are rotated from the front of the window assembly 100, the nuts may retract towards the panel 150 until they are engaged therewith.

FIG. 7c shows a portion of a cross section of the embodiment shown in FIG. 7b, taken at line 7-7. FIG. 7c illustrates a possible configuration of the engagement of an attachment member with the panel. Here, the attachment member comprises a wedge portion 742 such that, as the attachment member translates toward the panel, the wedge portion 742 engages the inner edge 444 of the hole. Thus, even though the panel may comprise an insulative coating, the wedge portion 742 may allow for an electrical connection between the window assembly 100 and the panel 150 via the uncoated inner edge 444 of the hole. In some embodiments, an additional portion of the attachment member may engage the back side 226 of the panel as well, as shown in the figure.

Various examples and features of viewing window assemblies have been described. Such descriptions are exemplary in nature and in no way define the limitations of the invention. Rather, the examples described herein illustrate certain embodiments of the present invention which, among other examples, are within the scope of the following claims.

The invention claimed is:

1. A viewing window assembly designed for mounting in a single hole of a panel of an enclosure, the viewing window assembly comprising:
   a frame;
   an optic defining a central axis;
   a front side, the front side facing away from the enclosure when the viewing window assembly is mounted therein;
   a back side, the back side facing the inside of the enclosure when the viewing window assembly is mounted therein; and
   one or more actuators, each coupled to an attachment member positioned at the back side of the viewing window assembly, the one or more actuators actuatable from the front side of the viewing window assembly, and the respective attachment members configurable so as to allow each to pass through the single hole of the panel, and
   the respective attachment members arranged that, when actuated, the one or more actuators move at least a portion of the one or more respective attachment members at least in a direction away from the central axis of the viewing window assembly in such a manner so that the at least a portion of the one or more respective attachment members are adapted to engage an inside surface of the panel of the enclosure about a perimeter of the single hole in order to install and secure the viewing window assembly to the panel of the enclosure from a single side of the panel and via the single hole.

2. The viewing window assembly of claim 1, further comprising a gasket between the frame and the enclosure when the window is secured to the enclosure.

3. The viewing window assembly of claim 1, further comprising a cover for covering at least a portion of the optic, and a gasket between the frame and the cover when the cover is in the closed position.

4. The viewing window assembly of claim 3, wherein the cover is attached to the frame by a hinge.

5. The viewing window assembly of claim 1, wherein each of the respective attachment members comprises at least one tooth for engaging the enclosure.

6. The viewing window assembly of claim 1, wherein the direction of movement of each of the respective attachment members is not perpendicular to the plane of the window.

7. The viewing window assembly of claim 6, wherein the direction of movement of each of the respective attachment members forms an angle between 30 and 60 degrees with the plane of the window.

8. The viewing window assembly of claim 1, wherein the one or more actuators are bolts, the one or more associated attachment members are nuts, and wherein actuating the actuators comprises rotating the bolts.

9. The viewing window assembly of claim 1, wherein the enclosure comprises an electrical cabinet.

10. The viewing window assembly of claim 1, wherein the optic comprises an infrared-transmissive material.

11. The viewing window assembly of claim 1, further comprising a retaining ring for removably securing the optic in the frame, the retaining ring and optic being removable via the front side of the viewing window assembly.

12. The viewing window assembly of claim 1, wherein each of the respective attachment members is partially rotatable and comprises a threaded portion and a wing portion, and configured such that when an actuator is actuated, the wing portion rotates away from the central axis and toward the panel so that at least a portion of the wing portion engages an inner surface of the panel.

13. The viewing window assembly of claim 12, wherein the wing portion of each of the respective attachment members comprises at least one tooth on the surface that engages the panel.

14. The viewing window assembly of claim 1, wherein each of the respective attachment members comprises a wedge portion for engaging the inner edge of the single hole.

15. A viewing window assembly designed for mounting in a single hole, the viewing window assembly comprising:
   a frame;
   an optic defining a central axis;
   at least two bolts extending longitudinally through the frame from a front side of the viewing window assembly to a rear side of the viewing window assembly and rotatable from the front side of the viewing window assembly;
   at least two nuts, each nut threadably engaged with an associated one of the at least two bolts such that at least a portion of each of the nuts can be inserted through the single hole while each nut is threadably engaged with the associated bolt; wherein
   the nuts and bolts are configured such that rotating a bolt from the outside of the enclosure causes at least part of its associated nut to move in a direction with components toward the optic or away from the central axis.

16. The viewing window assembly of claim 15, further comprising a stop configured to at least partially limit the rotation of the nut.

17. The viewing window assembly of claim 15, wherein at least one nut further comprises a plurality of teeth.

18. The viewing window assembly of claim 15, wherein the longitudinal axis of the bolts forms a non-90 degree angle with the plane of the optic.

19. The viewing window assembly of claim 18, wherein the bolts form between a 30 and 60 degree angle with the plane of the optic.

20. The viewing window assembly of claim 15, wherein at least one of the at least two nuts comprises a wing nut having a threaded portion and a wing portion, and is configured such that when a bolt is rotated, the wing portion may rotate outward, away from the central axis, and additionally translate toward the frame.

21. The viewing window assembly of claim 20, wherein the wing portion of the at least one nut further comprises at least one tooth.

22. The viewing window assembly of claim 15, wherein the optic comprises an infrared transmissive material.

23. The viewing window assembly of claim 15, further comprising a cover for at least partially covering the optic.

* * * * *